United States Patent Office 2,735,782
Patented Feb. 21, 1956

2,735,782

STABILIZED PIGMENTED CELLULOSE ACETATE-BUTYRATE MOLDING COMPOSITIONS CONTAINING PROPYL GALLATE

George C. De Croes and John W. Tamblyn, Kingsport, Tenn., assignors to Eastman Kodak Company, Rochester N. Y., a corporation of New Jersey No Drawing. Application September 15, 1952,
Serial No. 309,742

1 Claim. (Cl. 106—182)

This invention relates to cellulose acetate-butyrate molding compositions, and more particularly to compositions of this nature which are suitable for outdoor use. It is known that the weathering encountered in outdoor use has a deleterious effect on plastics. Addition of certain pigments and/or of antioxidants to the plastic compositions has been known to prolong their life under outdoor conditions to some extent, but in the case of light-colored pigments the improvement obtained was not outstanding, even when an antioxidant was also added. Some pigments even catalyze the deterioration.

We have found a combination of pigment and antioxidant which has a synergistic effect, prolonging the outdoor life of cellulose acetate-butyrate compositions far beyond what could be expected from the individual effects of the pigment and the anti-oxidant. One pigment which is desirable in cellulose acetatebutyrate plastics for outdoor use is the anatase form of titanium dioxide. It gives a white plastic which is useful in plastic tire covers and as a protective coating on metal tubing for hand railings and lawn furniture, the coating being extruded onto the tubing. We have found that a combination of propyl gallate and the anatase form of titanium dioxide prolongs to a surprising extent the resistance to weathering of cellulose acetate-butyrate molding compositions.

In testing the cellulose acetate-butyrate molded composistions, compression-molded samples, 2.5" x 0.5" x 0.050", from a rolled composition consisting of 100 parts of cellulose acetate-butyrate (37% butyryl; 13% acetyl), 12 parts of dibutyl sebacate and the indicated parts of propyl gallate and/or anatase titanium dioxide were exposed at 60° C. in a modified Atlas Twin-Arc Weather-Ometer set on the 51 min.: 9 min. dry: wet cycle with the sample drum revolving once a minute. The modification of the Weather-Ometer consisted in the addition of 8 Westinghouse 20-watt fluorescent sun lamps, mounted vertically at a distance of about 2 inches from the sample drum. This modification of the Weather-Ometer was described in detail in a paper by J. W. Tamblyn and G. M. Armstrong, entitled "A Modification of the Atlas Twin-Arc Weather-Ometer," presented March 31, 1952 before the Division of Paint, Varnish, and Plastics Chemistry of the American Chemical Society, at a national meeting in Milwaukee, Wisconsin, and published in Analytical Chemistry 25, 460–5 (1953).

Inherent viscosities were measured in acetone solutions at a concentration of 0.23 g. per 100 cc. Brittleness was defined as a break at bend angles of less than 90° when the piece was bent in the Tour-Marshall test for stiffness in flexure (A. S. T. M. D747–43T). The flexural strength was calculated from data obtained by the aforesaid Tour-Marshall test. The following table illustrates the results obtained. In the table, the abbreviation "pt." stands for parts per 100 parts of cellulose acetate-butyrate, by weight.

| Antioxidant | Pigment | Original Color of Plastic | Color After Exposure | Hours Exposure Required for— | | |
|---|---|---|---|---|---|---|
| | | | | 25% Loss in Flexural Strength | 25% Loss in Inherent Viscosity | Development of Brittleness |
| None | None | Water clear | Water clear | 150 | 160 | 150 |
| 1 pt. propyl gallate | do | do | do | 300 | | 300 |
| None | 2 pt. anatase TiO₂ | White | White | 550 | 1,300 | 400 |
| 1 pt. propyl gallate | 2 pt. anatase TiO₂ | Grayish-white | do | >4,700 | >4,700 | >4,700 |

The very great improvement brought about by the combination of specific pigment and specific antioxidant is evident from the table. The specific plasticizer used in the example forms no part of our invention. Similar results may be obtained with cellulose acetate-butyrate plastics in which other known plasticizers therefor are used. The butyryl and acetyl contents of the cellulose acetate-butyrate may also be varied. The proportions of pigment and antioxidant with relation to each other and to the cellulose acetate-butyrate may also be varied.

What we claim as our invention and desire to be secured by Letters Patent of the United States is:

A cellulose acetate-butyrate molding composition stabilized against weathering by a content of approximately 1 part of propyl gallate and 2 parts of the anatase form of titanium dioxide pigment per 100 parts of cellulose acetate-butyrate, by weight.

References Cited in the file of this patent

UNITED STATES PATENTS

| | | |
|---|---|---|
| 1,955,825 | Palmer | Apr. 24, 1934 |
| 2,223,893 | Lohmann | Dec. 3, 1940 |
| 2,432,517 | Dreyfus | Dec. 16, 1947 |
| 2,499,526 | Prichard | Mar. 7, 1950 |

FOREIGN PATENTS

| | | |
|---|---|---|
| 645,392 | Great Britain | Nov. 1, 1950 |